United States Patent
Carpenter

(10) Patent No.: US 7,720,788 B2
(45) Date of Patent: May 18, 2010

(54) SYSTEM AND METHOD FOR IMPLEMENTING A WIRELESS ACCESS PROTOCOL PUSH BY ESTABLISHING CONNECTION-ORIENTED SIGNALING CHANNEL FOR TRANSMITTING SESSION INITIATION REQUEST

(75) Inventor: Paul Marcus Carpenter, St Margarets (GB)

(73) Assignee: Research In Motion Limited, Waterloo, Ontario (CA)

( * ) Notice: Subject to any disclaimer, the term of this patent is extended or adjusted under 35 U.S.C. 154(b) by 1097 days.

(21) Appl. No.: 10/825,449

(22) Filed: Apr. 15, 2004

(65) Prior Publication Data
US 2005/0235046 A1 Oct. 20, 2005

(51) Int. Cl.
- G06F 15/16 (2006.01)
- G06F 15/00 (2006.01)
- H04W 4/00 (2009.01)

(52) U.S. Cl. .................... 706/62; 455/466; 709/219
(58) Field of Classification Search .............. 709/219
See application file for complete search history.

(56) References Cited

U.S. PATENT DOCUMENTS

| | | | |
|---|---|---|---|
| 2005/0014489 A1* | 1/2005 | Zhigang | 455/414.2 |
| 2005/0020234 A1* | 1/2005 | Iivari et al. | 455/403 |
| 2005/0071419 A1* | 3/2005 | Lewontin | 709/201 |

OTHER PUBLICATIONS

F. Turner, "The Interlibrary Loan Protocol: An OSI Solution to ILL Messaging", Library Hi Tech, vol. 8, No. 4, 1990, pp. 73-82.*

"Over The Air over HTTP", http://www.google.com/search?q=cache:BxSAsVsQtLkJ:ccmc.knu.ac.kr/files/seminar/2002_winter/push_framework/push_framework5.ppt+SIR+connection-oriented&hl=en&ct=clnk&cd=5&gl=us, 2002-winter.*
"WAP Push Architectural Overview, Proposed Version Jul. 3, 2001," Wireless Application Protocol Forum, Ltd., 2001.
"Push OTA Protocol"; Version 25-Apr. 2001; Wireless Application Protocol; WAP-235-PushOTA-20010425-a.
"WAP Over GSM USSD"; Version 30-Jul. 2001; Wireless Application Protocol; WAP-204-WAPOverGSMUSSD-20010730-a.
"What is WAP?"; GSM World; Simon Buckingham; Jan. 2000.

* cited by examiner

Primary Examiner—David R Vincent
Assistant Examiner—Li-Wu Chang
(74) Attorney, Agent, or Firm—David C. Jenkins; Brij K. Agarwal; Eckert Seamans Cherin & Mellott, LLC

(57) ABSTRACT

Methods and apparatus for initiating a Wireless Access Protocol (WAP) push session to push information from a push proxy gateway to a mobile station in a wireless communication network are provided. In one embodiment, the method comprises transmitting an initiation request to the mobile station using a connection-oriented signalling channel, the mobile station establishing a push session in response to the initiation request. Preferably, the connection-oriented signalling channel transmits the initiation request without using a store-and-forward mechanism. In one embodiment, the connection-oriented signalling channel comprises an Unstructured Supplementary Service Data (USSD) channel. The initiation request may conform to a WAP protocol for Service Initiation Requests (SIRs) or a USSD protocol for Unstructured Supplementary Service Requests (USSRs). In the latter case, the method may comprise establishing a connection with the mobile station using USSD; and sending a USSR message requesting the mobile station to activate and establish a push session.

19 Claims, 4 Drawing Sheets

SYSTEM AND METHOD FOR IMPLEMENTING A WIRELESS ACCESS PROTOCOL PUSH BY ESTABLISHING CONNECTION-ORIENTED SIGNALING CHANNEL FOR TRANSMITTING SESSION INITIATION REQUEST

The present invention relates generally to implementing a Wireless Access Protocol (WAP) push and specifically to a system and a method for transmitting a Session Initiation Request.

BACKGROUND OF THE INVENTION

In a typical client/server environment, a client engages a server with a request for service or information. The server responds to the request and returns information to the client. This interaction is referred to as a pull, since the client is effectively pulling information from the server. A good example of a typical pull is searching a search engine on the Internet. In this example, the client transmits a search string to the server, which responds with a list of matching elements.

Another client/server interaction involves the server transmitting information to the client without explicit instruction from the client to do so. This interaction is referred to as a push, since the server is effectively pushing information to the client. A good example of a typical push is the frequent transmission of a stock quote. The server runs software that is configured to record the stock quote at predetermined intervals and automatically transmit updates to the client. Accordingly, even though the client is not requesting the information at these intervals, the information is transmitted from the server.

For wireless networks, the current industry standard for the delivery of a push service is a Wireless Access Protocol (WAP) Push. Referring to FIG. 1, the architecture for performing a WAP Push is shown generally by numeral 100. The architecture 100 includes a Push Initiator (PI) 102, a Push Proxy Gateway (PPG) 104 and a mobile station 106. The Push Initiator 102 is typically an application running on a server in a network. The Push Initiator 102 and the PPG 104 communicate across a link 108 using a Push Access Protocol. The PPG 104, in turn, communicates with the mobile station 106 via a link 110 using a Push Over the Air Protocol.

However, in a case where an active bearer (i.e. an active network used to carry the messages of a transport-layer protocol between devices) is not available for the delivery of a Push via General Packet Radio Service (GPRS), a procedure is defined to initiate a Packet Data Protocol (PDP) Context, thus making an active bearer available. In accordance with the WAP Push specification, WAP-250-PushArchOverview-20010703-a, Version 03-Jul.-2001, the PPG 104 sends a Session Initiation Request (SIR) to a Session Initiation Application (SIA).

The SIA is an application that resides on the mobile station 106 and has been specified for the purpose for receiving and responding to SIR messages. Once the SIA receives the SIR from the PPG 104, it responds by activating an appropriate bearer and contacts the desired PPG 104 to establish the push session. The PPG 104 can then push the desired information to the mobile station 106.

Typically, the SIR is transmitted to the SIA using connectionless push, via Short Message Service (SMS). Referring to FIG. 2, a sample SMS architecture is illustrated generally by numeral 200. A SMS Centre (SMSC) 202 is coupled to the PPG 104 for receiving the SIR. The SMSC 202 is further coupled with a home location register (HLR) 204 via a signal transfer point (STP) 206. The STP 206 is further coupled to the mobile stations 106 via an over the air network 208.

The PPG 104 transmits the SIR to the SMSC 202. The SMSC 202, which acts as a store and forward system, stores the SIR. The SMSC 202 sends a SMS Request to the HLR 204 for locating the corresponding mobile station 106 to which the SIR is to be sent. The HLR 204 responds to the SMS Request with the mobile station's status.

If the mobile station's status is inactive, the SMSC 202 will wait for a predefined period of time. Once the mobile station 106 becomes active, the HLR 204 sends a SMS Notification to the SMSC 202. If the SMSC has not received the SMS Notification before the predefined amount of time has expired, the SMSC 202 will try to retransmit the SMS Request.

If the mobile station's status is active, the HLR 204 transmits the location of the mobile station 106 to the SMSC 202, which transfers the message to the mobile station 106. Once the message is delivered, the mobile station 106 responds with a verification that the message was received and the SMSC 202 does not attempt to send the SIR again. Once the SIA receives the SIR, a PDP context is established with the PPG 104 and the push can occur.

However, although conveying the SIR via SMS provides persistence, it also introduces a number of limitations. As previously described, SMS is a store and forward system which introduces delays into the delivery of the SIR message.

Further, a well know race condition can occur between the SMSC 202 and the HLR 204, which causes the SIR to be held pending at the SMSC for extended periods of time. This situation frequently occurs when the user is roaming and manifests itself, for example, as a bunching of SMS messages. A backlog of messages is delivered after the HLR and visitor location register (VLR) have been updated, typically when the user attempts to make or receive a phone call.

Yet further, delivery of the SIR via SMS is not perfectly reliable and, due to the store and forward nature of the system, the originator of the message will not discover that the message has not been delivered until the validity period for the SMS message expires, which can be significant.

Accordingly, it is an object of the present invention to obviate or mitigate at least some of the above mentioned disadvantages.

SUMMARY OF THE INVENTION

Methods and apparatus for initiating a Wireless Access Protocol (WAP) push session to push information from a push proxy gateway to a mobile station in a wireless communication network are provided. In one embodiment, the method comprises transmitting an initiation request to the mobile station using a connection-oriented signalling channel, the mobile station establishing a push session in response to the initiation request to permit the push proxy gateway to push information to the mobile station. Preferably, the connection-oriented signalling channel transmits the initiation request without using a store-and-forward mechanism. In one embodiment, the connection-oriented signalling channel comprises a channel for transmitting Unstructured Supplementary Service Data (USSD). As such, the initiation request may conform to a WAP protocol for Service Initiation Requests (SIRs) or a USSD protocol for Unstructured Supplementary Service Requests (USSRs). In the latter case, the method may comprise establishing a connection with the mobile station using the channel for transmitting USSD; and sending a USSR message requesting the mobile station to activate and establish a push session.

In accordance with other aspects of the present invention, persons of ordinary skill in the art will recognise further methods, apparatus, systems and computer program products for implementing a Wireless Access Protocol (WAP) push session for delivering information to a mobile station.

BRIEF DESCRIPTION OF THE DRAWINGS

Embodiments of the present invention will now be described by way of example only with reference to the following drawings in which.

For convenience, like numerals in the description refer to like structures in the drawings.

DETAILED DESCRIPTION OF THE PREFERRED EMBODIMENTS

As noted above, to initiate a push session and activate a bearer for transmitting the pushed data between a PPG and a client mobile station, in accordance with prior art techniques, the PPG sends a SIR to the client in a connectionless manner, typically using SMS. An SIA of the client receives the SIR and, if appropriate, sets up the push session activating the bearer over which to receive the push data. In accordance with the teaching herein, a connection-oriented channel solution for transporting SIRs is provided eliminating the store and forward nature of the connectionless SMS-based prior art solution. An example channel is Unstructured Supplementary Service Data (USSD) is defined as part of GSM Recommendation 02.90, subsequently published as 3GPP specification 3G TS 23.090 from the 1999 Release onwards. USSD provides a connection-oriented signalling channel between a mobile station and a node application running in a digital cellular communications network allowing the application to request information from the mobile station or notify the mobile station without requiring information from the mobile station. In accordance with an embodiment of the present invention, rather than transmit an SIR using SMS, the SIR is transmitted using a USSD channel.

As noted, USSD provides a means of transmitting information or instructions in a GSM network. Though both SMS and USSD employ the GSM network's signalling path and permit a network application initiated communication to a mobile station, there are important differences between the two modes of communication. USSD is not a store and forward service and is session-oriented. When a session is established it remains open until the mobile station, network application or a time out releases it. As a result of the session-oriented nature and the lack of the store-and-forward feature, turnaround response times are shorter for USSD than SMS. If a USSD session cannot be established, the initiating application is quickly informed and may act accordingly.

Figure 1:
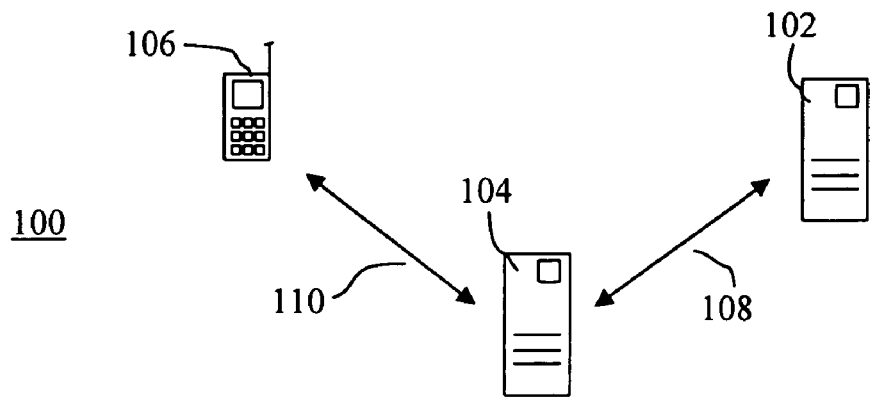
FIG. 1 is a schematic diagram illustrating a WAP Push architecture.
Figure 2:
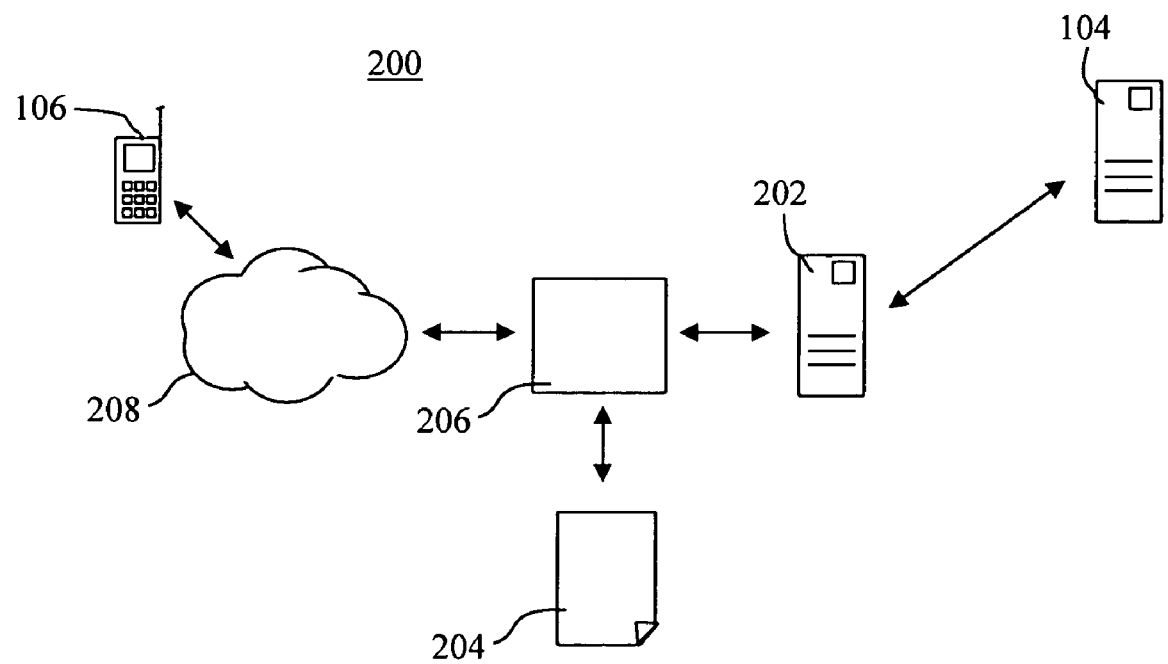
FIG. 2 is a schematic diagram illustrating a SMS architecture.
Figure 3:
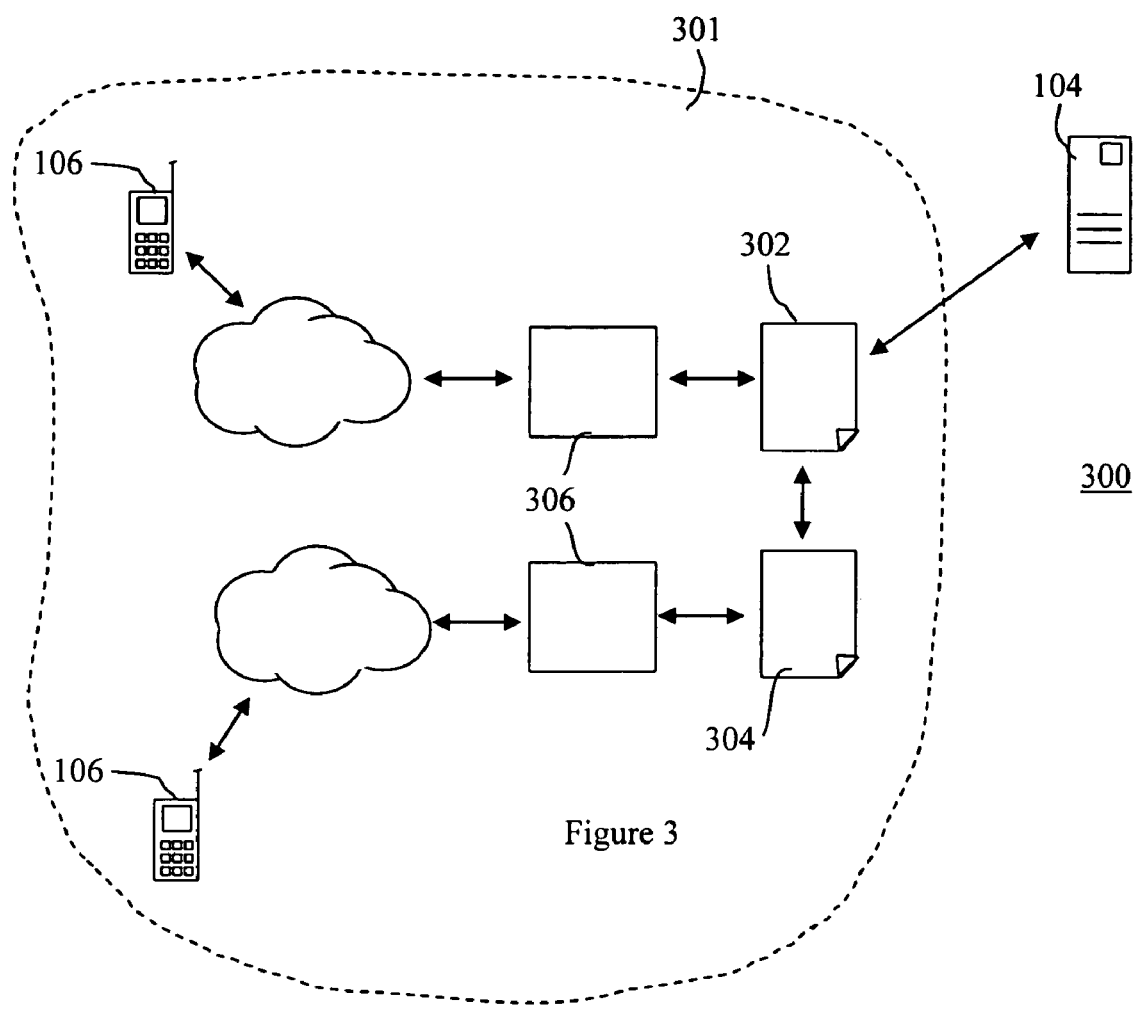
FIG. 3 is a schematic diagram illustrating a WAP Push architecture in accordance with an embodiment of the invention.

Referring to FIG. 3, a system architecture of the present embodiment is illustrated generally by numeral 300. The system 300 includes a PPG 104 coupled with a GSM network 301 supporting USSD signalling. Network 301 includes a GSM Home Location Register (HLR) 302, a GSM Visitor Location Register (VLR) 304, and Mobile.

Switching Centres (MSCs) 306. The HLR 302 is coupled with the VLR 304 in the event that the mobile station 106 is roaming. The HLR 302 and VLR 304 are further coupled to a corresponding MSC 306 for communicating with the mobile station 106.

Figure 4:
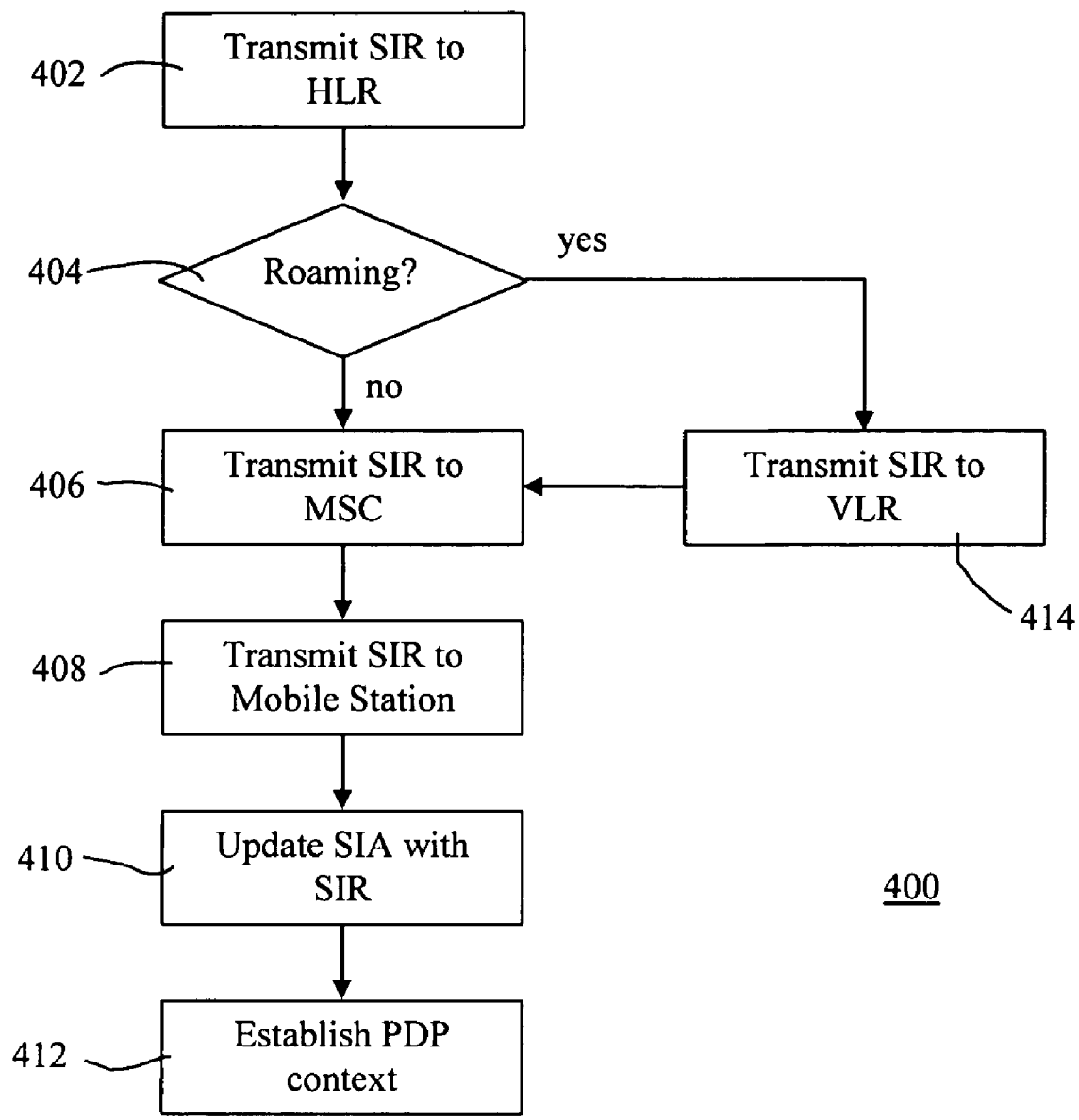
FIG. 4 is a flow chart illustrating the operation of an embodiment of the present invention.

Referring to FIG. 4 a flow chart illustrating the general operation of the present embodiment is illustrated by numeral 400. In Step 402, the PPG 104 transmits the SIR and an identifier for identifying the destination mobile station 106 and the destination application to the HLR 302. In step 404, it is determined if the mobile station is roaming. If the mobile station is not roaming, the operation proceeds to step 406. In Step 406, the SIR is transmitted to the corresponding MSC 306. In step 408, the MSC 306 transmits the message to the mobile station 106. In step 410, the mobile station 106 updates the SIA with the SIR. The mobile station establishes a push session in response to the initiation request towards the push proxy gateway to permit the push proxy gateway to push information to the mobile station. For example in Step 412, the SIR responds by activating an appropriate bearer and contacting the PPG 104.

If it is determined in step 404 that the mobile station 106 is roaming, the operation proceeds to Step 414. In Step 414, the HLR 302 transmits the information it received from the PPG 104 to the VLR 304. The operation then continues with Step 406.

Accordingly, the method described above provides a USSD bearer for delivering the SIR message to the mobile station 106. Thus, all of the existing WAP protocols can be maintained, which facilitates simple implementation of the present embodiment.

Figure 5:
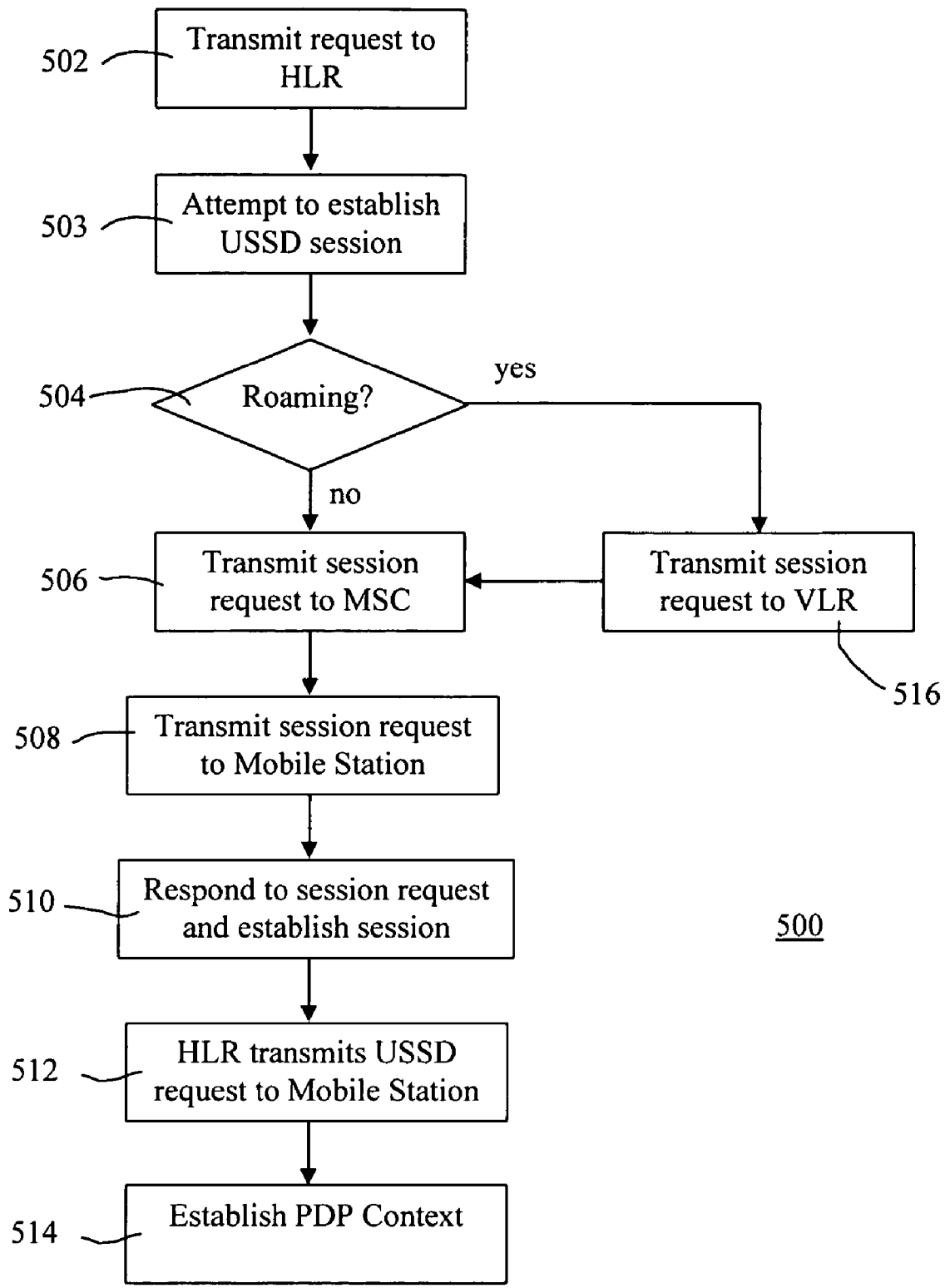
FIG. 5 is a flow chart illustrating the operation of an alternate embodiment of the present invention.

Referring to FIG. 5, a flow chart illustrating the operation of an alternate embodiment of the present invention is illustrated generally by numeral 500. In the present embodiment, the existing SIR message used in the WAP specifications is replaced by a custom USSD message.

In Step 502, the PPG 104 transmits a request to the HLR 302. The request is in a USSD format. A typical USSD request format is *N*MESSAGE#, where the * is used for separating parameters, N represents the requested service, MESSAGE represents supplementary information if necessary and the # is used for terminating the request. It will be appreciated by a person of ordinary skill in the art that the message may comprise more or less than the two parameters illustrated. Preferably such an initiating request message is standardized to enable interoperability between different vendor equipment. The initiating request message could take many forms, either as a textual string *ACTIVATE PDP#, numerical string *8845# or some other variant. Such a USSD message removes the need for the SIR in accordance with the WAP protocol, and could be extended to incorporate other fields, such as indicating any Quality of Service Requirements for the PDP context; e.g. *ACTIVATE PDP [conversational]#.

In step 503 the HLR 302 attempts to establish a USSD session with the mobile station 106. In step 504, it is determined if the mobile station is roaming. If the mobile station is not roaming, the operation proceeds to Step 506. In Step 506, a USSD session request is transmitted to the corresponding MSC 306. In Step 508, the MSC 306 transmits the session request to the mobile station 106. In step 510, the mobile station 106 responds to the request and establishes the session. In step 512, the HLR 302 transmits the USSD request to the mobile station 106. The mobile station establishes a push session in response to the initiation request towards the push proxy gateway to permit the push proxy gateway to push information to the mobile station. For example, in step 514, the mobile station receives the USSD request and responds by activating an appropriate bearer for establishing a PDP Context.

If it is determined in step 504 that the mobile station 106 is roaming, the operation proceeds to Step 516. In Step 516, the HLR 302 transmits the USSD request to the VLR 304. The operation then continues with Step 506.

The embodiments described above comprise several benefits. Specifically, using USSD as a bearer allows the Push to operate faster than is typically possible using SMS. Further, the race condition often encountered with SMS is not encountered using USSD. Yet further, a USSD based solution is session based. Thus, if the mobile station 106 is powered-off or out of range when an initiation request via USSD is attempted, an error message may be immediately returned to the PPG.

This effect, i.e. the immediate returning of an error message, is of particular benefit for time critical push information services. With the present state of the art, the use of SMS means that once the SIR has been sent then it will remain "pending" for the validity period of the SMS at the SMSC if the mobile station is powered off of or out of range. This could result in a backlog of SIR requests building up; e.g. with a service application that provides updates from a sports game every 10 minutes. With the use of USSD as described herein that service application would be aware practically immediately if the mobile station was available or not and can adapt its behaviour as appropriate; e.g. suspend the service, adapt the charging of the service or notify the user via some other mechanism (such as SMS) that they will have to re-initiate the service at their convenience.

It will be appreciated by a person of ordinary skill in the art that the previous descriptions are of preferred embodiments for implementing the invention, and the scope of the invention should not necessarily be limited by this description. Those of skill in the art may effect alterations, modifications and variations to the particular embodiments without departing from the scope of the application. For example, although the embodiments are described as using USSD, a person skilled in the art will appreciate that other protocols providing the same advantages may be substituted. The invention described herein is defined by the claim attached hereto and intend to cover and embrace all suitable changes in technology.

What is claimed is:

1. A method for initiating a Wireless Access Protocol (WAP) push session to push information from a push proxy gateway to a mobile station in a wireless communication network, the method comprising:
   in response to a request from a push proxy gateway to push information from the push proxy gateway to the mobile station, establishing a connection-oriented signalling channel between the network and the mobile station;
   using said connection-oriented signalling channel to transmit a session initiation request received from the push proxy gateway to the mobile station, the session initiation request being such that the mobile station activates a bearer for establishing a push session towards the push proxy gateway in response to the session initiation request, the bearer being distinct from the connection-oriented signalling channel;
   the push proxy gateway pushing information to the mobile station using the activated bearer;
   wherein the connection-oriented signalling channel used to transmit the session introduction request comprises a channel for transmitting Unstructured Supplementary Service Data (USSD).

2. The method of claim 1 wherein the activated bearer is a GPRS Packet Data Protocol Context.

3. The method of claim 1 wherein the connection-oriented signalling channel transmits the initiation request using a session oriented mechanism.

4. The method of claim 1 wherein the initiation request comprises an identification of the bearer for activating to support the establishing of the push session.

5. The method of claim 1 further comprising providing an error message to the push proxy gateway when said transmitting comprises failing to establish a session between the network and the mobile station using the connection-oriented signalling channel.

6. The method of claim 1 wherein the initiation request conforms to a WAP protocol for Service Initiation Requests (SIRs).

7. The method of claim 1 wherein the initiation request conforms to a USSD protocol for Unstructured Supplementary Service Requests (USSRs).

8. The method of claim 7 comprising: establishing a connection with the mobile station using the channel for transmitting USSD; and sending a USSR message requesting the mobile station to activate a Packet Data Protocol (PDP) context and establish a push session with the push proxy gateway.

9. The method of claim 1 comprising receiving the initiation request from the push proxy gateway.

10. A method for initiating a Wireless Access Protocol (WAP) push session to receive push information from a push proxy gateway at a mobile station in a wireless communication network, the method comprising:
    in response to a request from a push proxy gateway to push information from a push proxy gateway to the mobile station, establishing a connection-oriented signalling channel between the network and the mobile station and receiving a session initiation request at the mobile station using said connection-oriented signalling channel; and
    activating a bearer for establishing a push session towards the push proxy gateway in response to the session initiation request to permit the push proxy gateway to push information to the mobile station using the activated bearer, the bearer being distinct from the connection-oriented signalling channel;
    wherein the connection-oriented signalling channel used to transmit the session initiation request comprises a channel for transmitting Unstructured Supplementary Service Data (USSD);
    receiving information pushed from the push proxy gateway using the activated bearer.

11. The method of claim 10 wherein the activated bearer is a GPRS Data Protocol Context.

12. The method of claim 10 wherein the initiation request comprises an identification of the push proxy gateway for establishing the push session.

13. The method of claim 10 wherein the initiation request comprises an identification of a bearer for activating to support the establishing of the push session.

14. The method of claim 10 wherein the initiation request conforms to a WAP protocol for Service Initiation Requests (SIRs).

15. The method of claim 10 wherein the initiation request conforms to a USSD protocol for Unstructured Supplementary Service Requests (USSRs).

16. The method of claim 10 wherein the connection-oriented signalling channel transmits the initiation request using a session oriented mechanism.

17. The method as defined in claim 10 comprising providing the initiation request to a Session Initiation Application of the mobile station, the application adapted in accordance with a WAP protocol for initiating a push session.

18. A network node of a wireless communication network for initiating a Wireless Access Protocol (WAP) push session to push information from a push proxy gateway to a mobile station via the wireless communication network, the network node comprising:

a communications system for transmitting and receiving via the wireless network;

a processor coupled to the communication system for processing received messages and messages for sending; and a memory coupled to the processor for storing instructions to configure the processor to:

transmit a session initiation request to the mobile station by establishing a connection-oriented signalling channel between the network and the mobile station in response to a request to push information from a push proxy gateway to the mobile station and using said connection-oriented signalling channel to transmit said session initiation received request from the push proxy gateway to the mobile station; the session initiation request being such that said mobile station activates a bearer for establishing a push session towards the push proxy gateway in response to the session initiation request to permit the push proxy gateway to push information to the mobile station using said activated bearer, the bearer being distinct from the connection-oriented signalling channel;

wherein the connection-oriented signalling channel used to transmit the session initiation request comprises a channel for transmitting Unstructured Supplementary Service Data (USSD).

19. A mobile station for initiating a Wireless Access Protocol (WAP) push session to receive push information from a push proxy gateway via a wireless communication network, the mobile station comprising:

a communications system for transmitting and receiving via the wireless network;

a processor coupled to the communication system for processing received messages and messages for sending; and a memory coupled to the processor for storing instructions to configure the processor to:

in response to a request to push information from a push proxy gateway to the mobile station, establish a connection-oriented signalling channel between the network and the mobile station and receive a session initiation request at the mobile station using said connection-oriented signalling channel; and activate a bearer, the bearer being distinct from the connection-oriented signalling channel, to establish a push session towards the push proxy gateway in response to the session initiation request to permit the push proxy gateway to push information to the mobile station;

wherein the connection-oriented signalling channel over which the session initiation request is received comprises a channel for transmitting Unstructured Supplementary Service Data (USSD).

* * * * *